(12) United States Patent
Takahashi

(10) Patent No.: US 9,161,022 B2
(45) Date of Patent: Oct. 13, 2015

(54) ELECTRO-OPTICAL DEVICE, METHOD OF DRIVING ELECTRO-OPTICAL DEVICE, AND ELECTRONIC APPARATUS

(75) Inventor: Nariya Takahashi, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 799 days.

(21) Appl. No.: 13/419,252

(22) Filed: Mar. 13, 2012

(65) Prior Publication Data

US 2012/0236132 A1 Sep. 20, 2012

(30) Foreign Application Priority Data

Mar. 14, 2011 (JP) .................................. 2011-055741

(51) Int. Cl.
*H04N 13/04* (2006.01)
*G02B 27/22* (2006.01)
*G09G 3/00* (2006.01)
*G09G 3/36* (2006.01)

(52) U.S. Cl.
CPC ........ *H04N 13/0438* (2013.01); *G02B 27/2264* (2013.01); *G09G 3/002* (2013.01); *G09G 3/3614* (2013.01); *G09G 3/3655* (2013.01)

(58) Field of Classification Search
CPC ........... H04N 13/0438; G02B 27/2264; G09G 3/002; G09G 3/3614; G09G 3/3655
See application file for complete search history.

(56) References Cited

U.S. PATENT DOCUMENTS

| 7,084,861 B2 | 8/2006 | Iisaka |
| 2002/0140691 A1 | 10/2002 | Sato et al. |
| 2008/0239180 A1 | 10/2008 | Sekine |
| 2009/0160826 A1* | 6/2009 | Miller et al. .................. 345/204 |
| 2010/0207966 A1 | 8/2010 | Hosaka |
| 2011/0074938 A1* | 3/2011 | Nakahata ........................ 348/56 |
| 2012/0062535 A1 | 3/2012 | Hara |

FOREIGN PATENT DOCUMENTS

| JP | 2002-182620 A | 6/2002 |
| JP | 2003-114661 A | 4/2003 |
| JP | 2004-045741 A | 2/2004 |
| JP | 2008-268904 A | 11/2008 |
| JP | 2010-085955 A | 4/2010 |
| JP | 2010-191038 A | 9/2010 |

* cited by examiner

*Primary Examiner* — Joseph Ustaris
*Assistant Examiner* — Jill Sechser
(74) *Attorney, Agent, or Firm* — Maschoff Brennan

(57) ABSTRACT

One frame is divided into a first-half field and a second-half field, and each of the fields is further divided into subfields. In addition, a pixel is controlled to be turned on or off for each of the subfields to display a gradation. A right eye image is formed with a positive polarity in a first-half field of an odd block, and a left eye image is formed with a negative polarity in a second-half field. In an even block, a right eye image is formed with a negative polarity in a first-half field, and a left eye image is formed with a positive polarity in a second-half field.

7 Claims, 9 Drawing Sheets

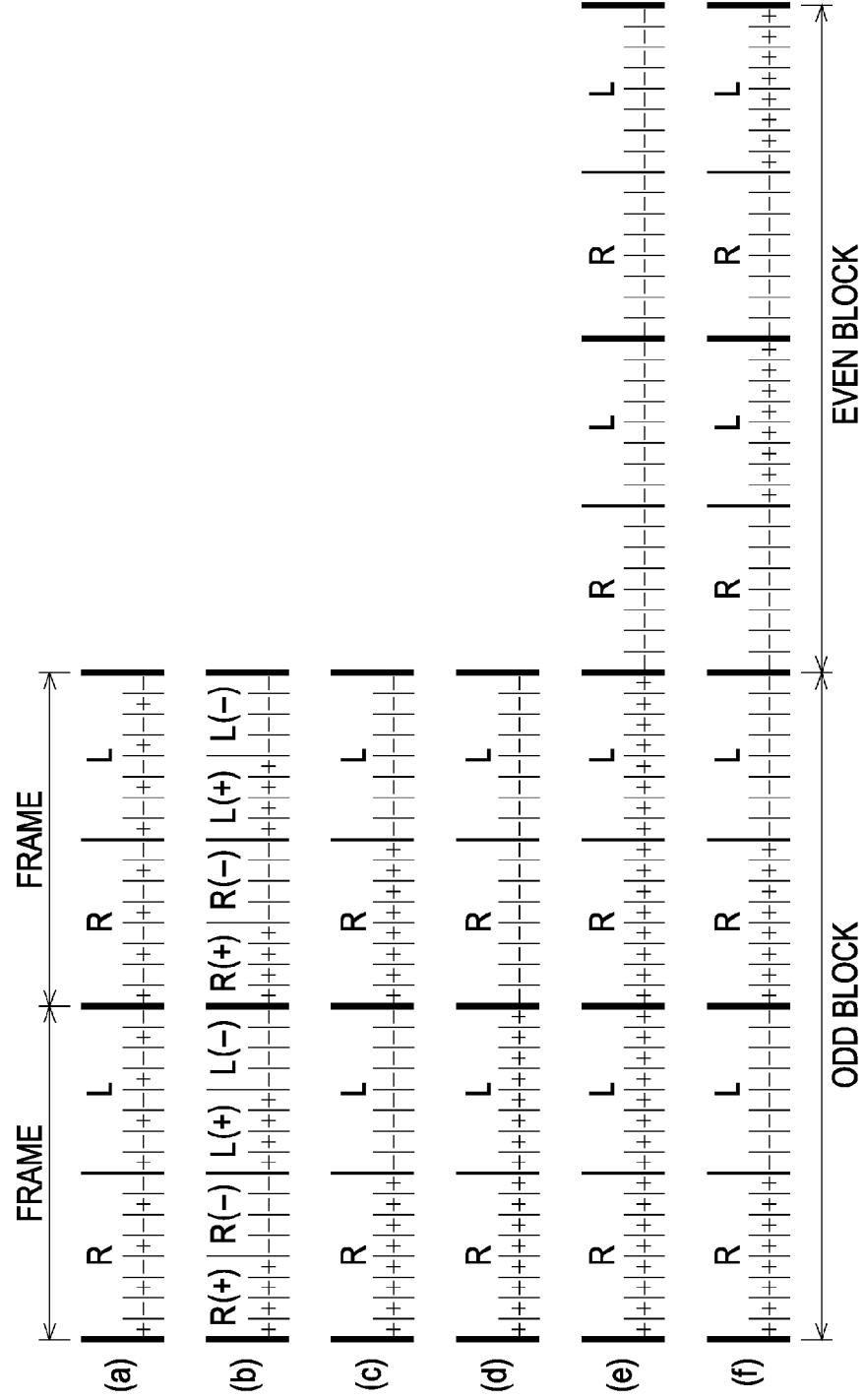

FIG. 5

| POLARITY INVERSION SYSTEM / EVALUATION ITEM | GRADATION PROPERTY | FLICKER | BURN-IN |
|---|---|---|---|
| (a) POLARITY INVERSION FOR EACH sf | 20sf | SMALL | SMALL |
| (b) QUADRUPLE-SPEED POLARITY INVERSION | 10sf | SMALL | SMALL |
| (c) DOUBLE-SPEED POLARITY INVERSION | 20sf | SMALL | LARGE |
| (d) SINGLE-SPEED POLARITY INVERSION | 20sf | LARGE | SMALL |
| (e) POLARITY INVERSION EVERY PLURALITY OF FRAMES | 20sf | SMALL TO MEDIUM | LARGE |
| (f) DOUBLE-SPEED POLARITY INVERSION AND POLARITY INVERSION EVERY PLURALITY OF FRAMES | 20sf | SMALL | SMALL |

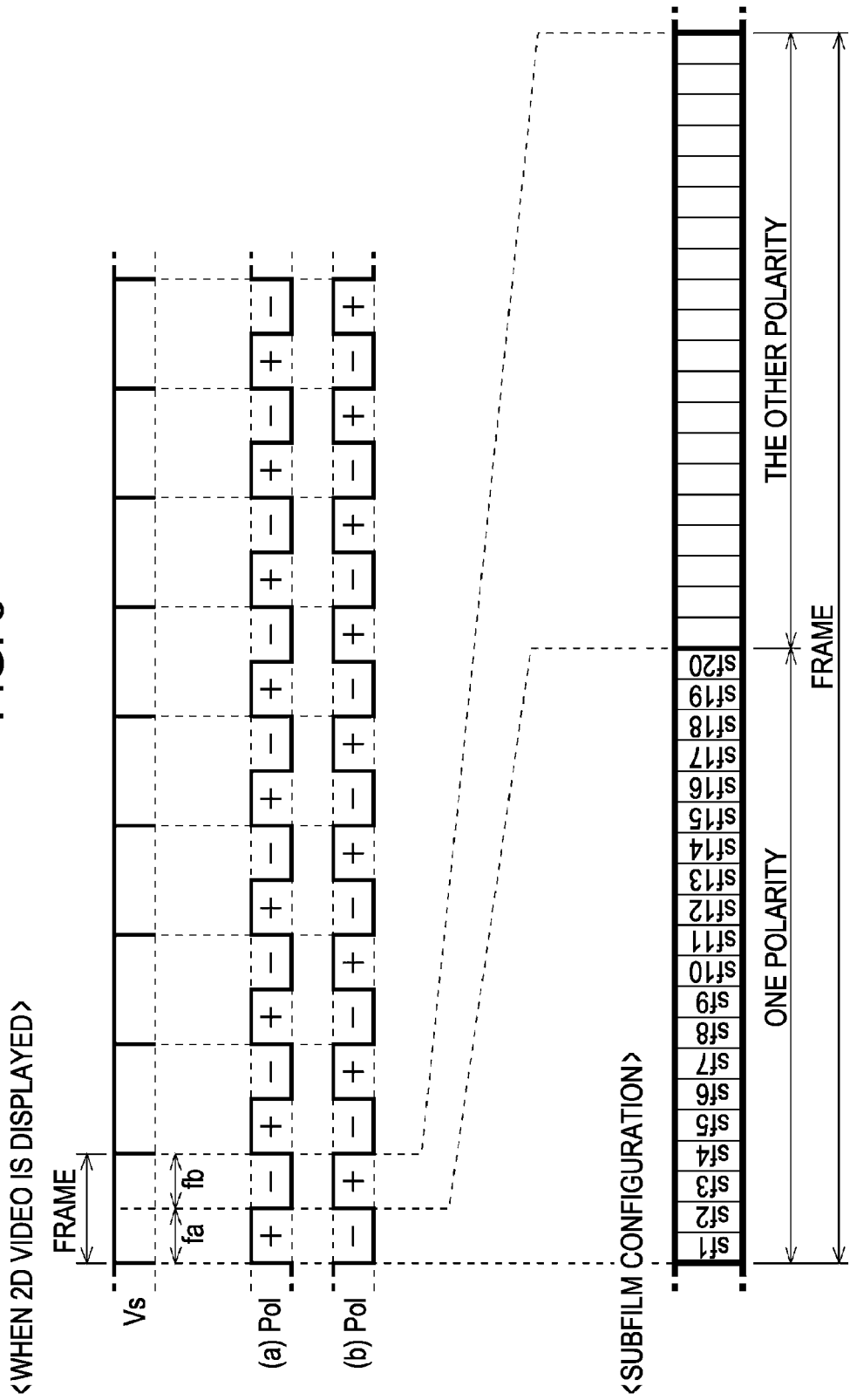

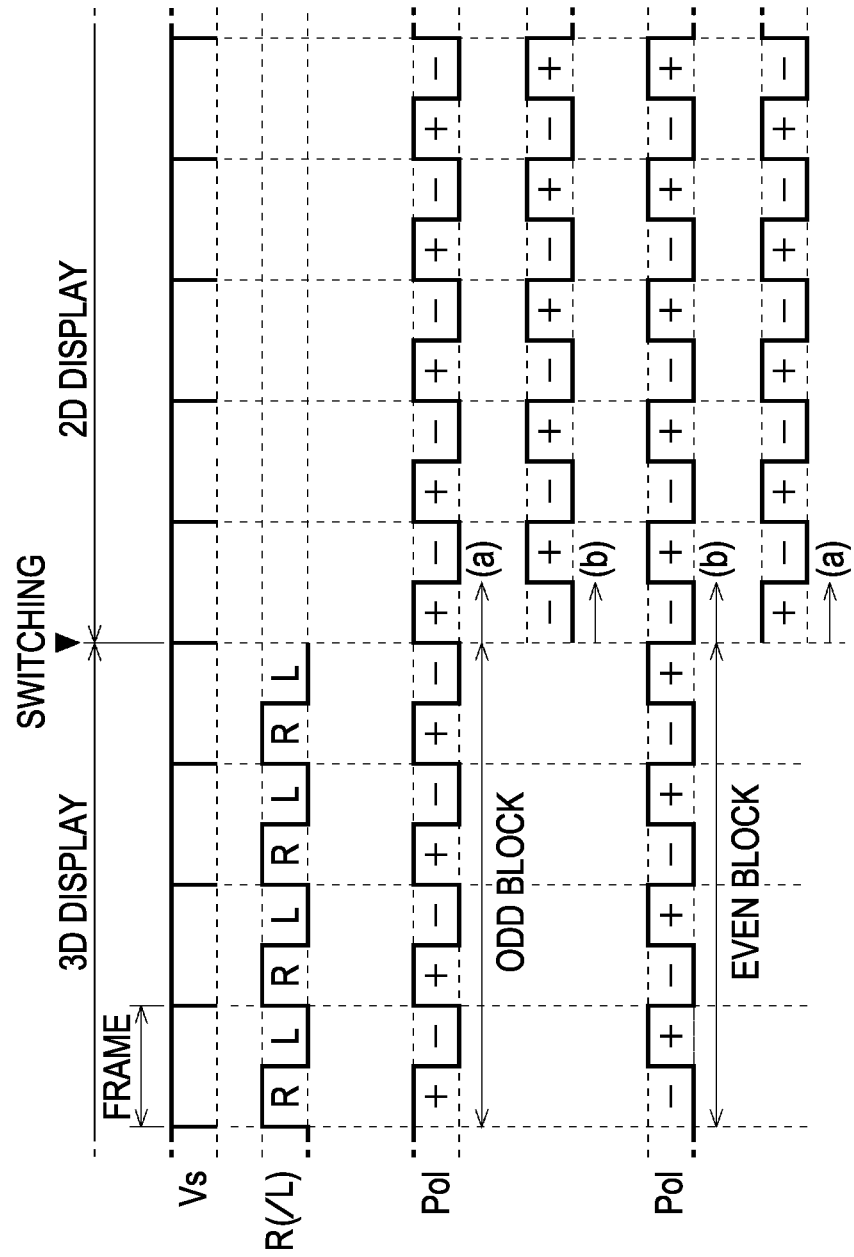

⟨2D→3D⟩

ELECTRO-OPTICAL DEVICE, METHOD OF DRIVING ELECTRO-OPTICAL DEVICE, AND ELECTRONIC APPARATUS

BACKGROUND

1. Technical Field

The present invention relates to a technique of reducing flickers and burn-in in displaying a three-dimensional (3 dimensions, hereinafter, abbreviated as "3D") video.

2. Related Art

The following technique is proposed to display a gradation in an electro-optical device having a liquid crystal element in a pixel. That is, there is proposed a technique of displaying an intermediate gradation by digitally turning a pixel either ON or OFF for each of a plurality of subfields into which one frame (one field) is divided and by changing a ratio of the turn-on (or -off) time.

In order to prevent burn-in of liquid crystal elements in the digital driving, a technique of inverting the polarity in a field a plural number of times and making the writing polarity of a subfield constituting a certain field inverse to the writing polarity of a subfield constituting the next field, (for example, see JP-A-2010-271611) and a technique of making the turn-on time with positive polarity equal to the turn-on time with negative polarity in one frame (for example, see JP-A-2010-85955) are proposed. In addition, there is also proposed a technique of increasing the number of displayable gradations as compared with the number of subfields by using the fact that the optical response speed of the liquid crystal element is relatively low (for example, see JP-A-2003-114661).

In recent years, apart from normal videos (2D), 3D video display is attracting more and more attention. Various 3D video display systems are proposed, and in general, a so-called 3D glasses system is used. Specifically, with the alternate display of a right eye image and a left eye image, the right eye portion of 3D glasses is made opaque when a left eye image is displayed, and the left eye portion of the 3D glasses is made opaque when a right eye image is displayed. According to the 3D glasses system, a viewer wearing 3D glasses visually confirms a left eye image only with the left eye and visually confirms a right eye image only with the right eye. Accordingly, it is possible to perceive that a displayed video has depth and is three-dimensional.

However, when a 3D video is displayed by digital driving, the number of subfields increases in order to display a left eye image and a right eye image, and thus it is difficult to express multi-gradation (gradation property). Furthermore, in an electro-optical device such as a liquid crystal display device, it is necessary to drive a left eye image and a right eye image with both polarities without generating a polarity difference.

SUMMARY

An advantage of some aspects of the invention is to provide a technique to secure a good gradation property and drive a left eye image and a right eye image with both polarities without generating a polarity difference in the display of a 3D video.

According to an aspect of the invention, a method of driving an electro-optical device which divides one frame into at least a first field and a second field, divides each of the fields into a plurality of subfields, and controls a pixel to be turned on or off for each of the subfields, thereby displaying a gradation, in which, when a 3D video is displayed, either one of a right eye image or a left eye image is formed with a first polarity in the first field, and the other image is formed with a second polarity in the second field, and when a plurality of frames elapse, either image is formed with the second polarity in the first field, and the other image is formed with the first polarity in the second field. According to the aspect of the invention, it is possible to secure a good gradation property and drive a left eye image and a right eye image with both polarities without generating a polarity difference. In addition, high driving capability is not required for the pixel driving.

It is preferable that when a 2D video is displayed, an image of one frame be formed with either one of the first polarity or the second polarity in the first field, and the image of the frame be formed with the other polarity in the second field. According to the aspect of the invention, the polarity inversion is executed with the same cycles not only in the display of a 3D video, but also in the display of a 2D video.

Here, it is preferable that in the switching from the display of the 3D video to the display of the 2D video, the other image be formed with the second polarity in the second field in the display of the 3D video, and then the image of one frame be formed with the first polarity in the first field in the display of the 2D video. On the other hand, it is preferable that in the switching from the display of the 2D video to the display of the 3D video, the image of the frame be formed with the second polarity in the second field in the display of the 2D video, and then either image be formed with the first polarity in the first field in the display of the 3D video.

The concept of the invention includes, as well as the method of driving an electro-optical device, an electro-optical device itself, and an electronic apparatus incorporating the electro-optical device. Examples of such an electronic apparatus include projectors and the like.

BRIEF DESCRIPTION OF THE DRAWINGS

The invention will be described with reference to the accompanying drawings, wherein like numbers reference like elements.

FIG. 4 is a diagram showing a comparison of various polarity inversion systems.

FIG. 5 is a table showing a comparison of the various polarity inversion systems.

FIG. 6 shows the operation when a 2D video is displayed in the electro-optical device.

FIG. 7 is a diagram showing an example of switching from a 3D video to a 2D video in the electro-optical device.

DESCRIPTION OF EXEMPLARY EMBODIMENTS

Hereinafter, embodiments of the invention will be described with reference to the drawings.

Figure 1:
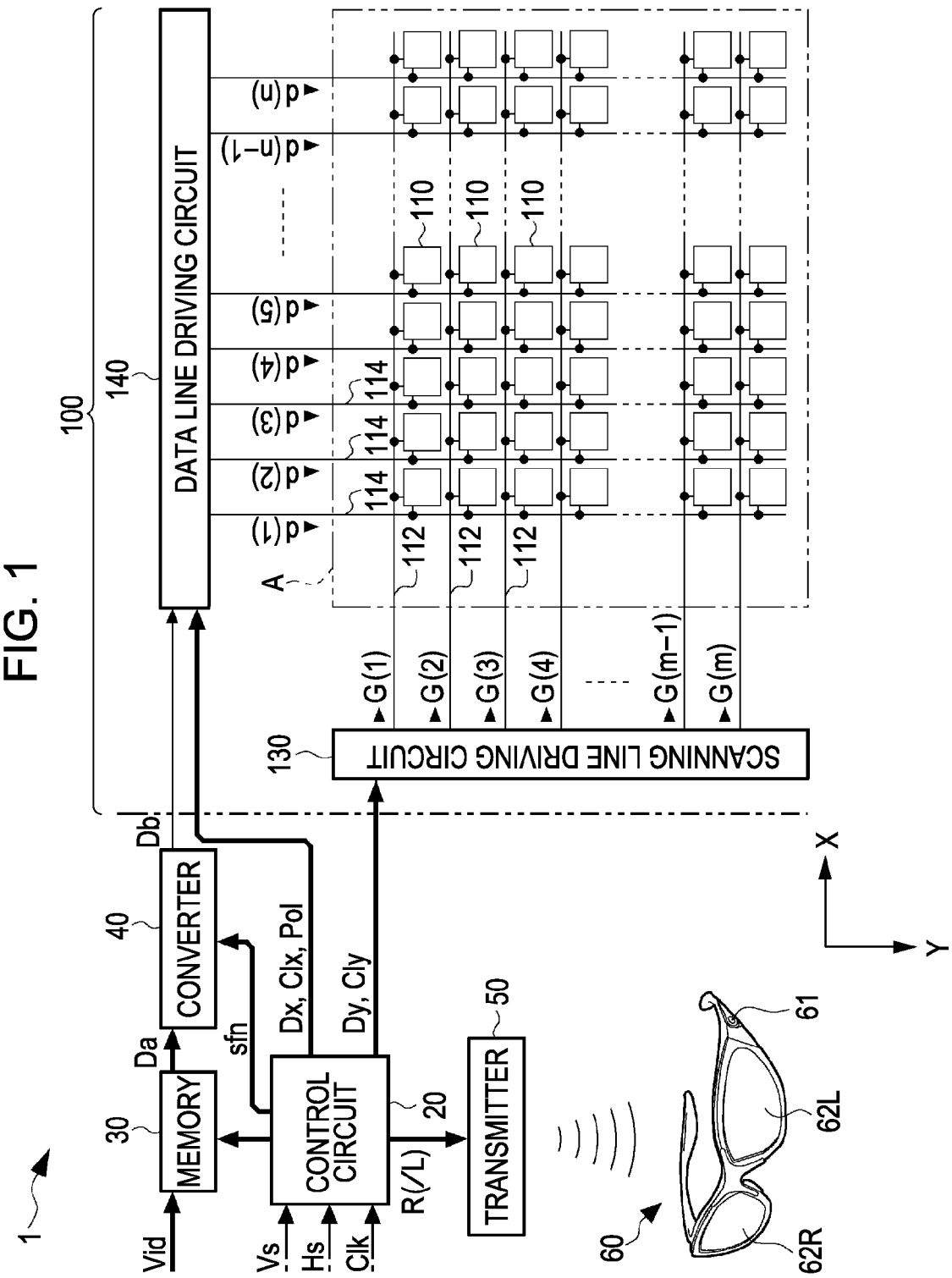
FIG. 1 is a block diagram showing the configuration of an electro-optical device according to an embodiment of the invention.

FIG. 1 is a block diagram showing the entire configuration of an electro-optical device according to an embodiment of the invention.

In the drawing, an electro-optical device 1 enables perception a 3D video when 3D glasses 60 are worn, and includes a liquid crystal panel 100, a control circuit 20, a memory 30, a converter 40, and a transmitter 50.

Among them, the control circuit 20 controls the portions in synchronization with a vertical scanning signal Vs, a horizontal scanning signal Hs, and a dot clock signal Clk which are supplied from a host device (not shown).

In the liquid crystal panel 100, pixels 110 are arranged in a matrix in a display region A. Specifically, in the display region A, m rows of scanning lines 112 extend in the X (horizontal) direction in the drawing, and n columns of data lines 114 extend in the Y (vertical) direction in the drawing while maintaining the electrical insulation with the scanning lines 112. Each of the pixels 110 is provided to correspond to the intersection of the scanning line 112 and the data line 114. Accordingly, in the embodiment, the pixels 110 are arranged in a matrix of m rows×n columns. m and n are natural numbers.

The memory 30 has storage regions corresponding to the respective pixels 110 which are arranged in m rows×n columns. Each storage region stores a video signal Vid corresponding to each pixel 110. The video signal Vid is digital data which designates the brightness (gradation level) of the pixel 110 as 8 bit data. The video signal Vid is stored in a storage region corresponding to the pixel in accordance with the control circuit 20 and has a configuration so that data corresponding to the pixels to be scanned in the liquid crystal panel 100 is read out as display data Da from the memory 30.

The converter 40 converts the read out display data Da into display bits Db which designate whether to turn on or off the pixel 110 (liquid crystal element) in accordance with the gradation level which is designated by the display data Da and the subfield which is specified by data sfn.

When a 3D video is displayed, two types of video signals Vid corresponding to a left eye image and a right eye image having a time difference therebetween are supplied in a time division manner. Accordingly, in accordance with whether the image which is formed in the liquid crystal panel 100 is an image for the right eye or the left eye, the storage and the readout of the memory 30 and the conversion by the converter 40 are controlled.

Figure 2:
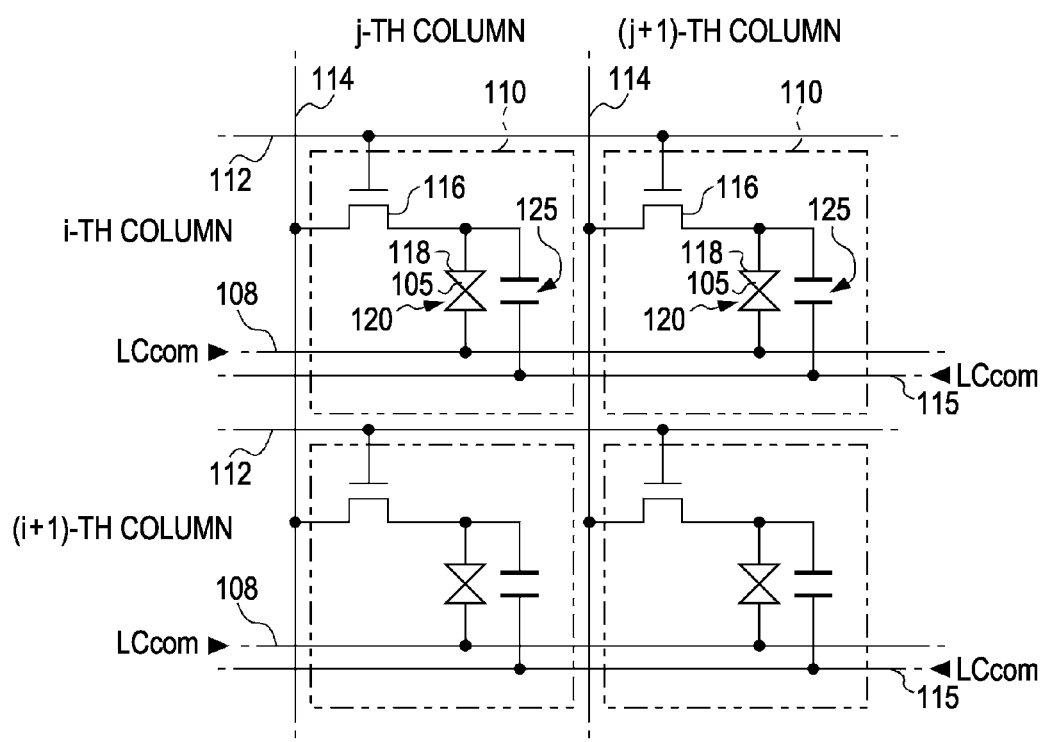
FIG. 2 is a diagram showing an equivalent circuit of a pixel in the electro-optical device.

For the sake of convenience, the configuration of a pixel 110 will be described with reference to FIG. 2. FIG. 2 shows a total of four pixels 110 (2×2) corresponding to the intersections of scanning lines 112 of the i-th row and the (i+1)-th row disposed below and next to the i-th row and data lines 114 of the j-th column and the (j+1)-th column disposed on the right side of and next to the j-th column. Here, i and (i+1) are symbols when generally representing the row of the scanning line 112 or the row of the pixel 110, and are integers from 1 to m. Similarly, j and (j+1) are symbols used when generally representing the column of the data line 114 or the column of the pixel 110, and are integers from 1 to n.

As shown in FIG. 2, each pixel 110 includes an N-channel-type thin film transistor (TFT) 116, a liquid crystal element 120, and an auxiliary capacity 125.

Here, the respective pixels 110 have the same configuration. Accordingly, when describing the pixel 110 positioned at the intersection of the i-th row and the j-th column as representative, a gate electrode of the TFT 116 in the pixel 110 at the intersection of the i-th row and the j-th column is connected to the scanning line 112 of the i-th row, a source electrode is connected to the data line 114 of the j-th column, and a drain electrode is connected to a pixel electrode 118 which is one end of the liquid crystal element 120 and one end of the auxiliary capacity 125. In addition, the other end of the liquid crystal element 120 is a common electrode 108. The common electrode 108 is common to all of the pixels 110, and in the embodiment, it is maintained at a voltage LCcom. In addition, the other end of the auxiliary capacity 125 is a capacity line 115, common to all of the pixels 110, and maintained at the same voltage LCcom as in the case of the common electrode 108. Therefore, the auxiliary capacity 125 is connected in parallel to the liquid crystal element 120 for each pixel 110.

In the embodiment, the liquid crystal element 120 is, for example, a transmission-type, and in a normally black mode in which the transmittance is minimum when no voltages are applied.

The liquid crystal panel 100 has a structure in which an element substrate having the scanning line 112, the data line 114, the TFT 116, the pixel electrode 118, the auxiliary capacity 125 and the like formed thereon and an opposite substrate having the common electrode 108 formed thereon are adhered to each other so that electrode forming surfaces thereof are opposed to each other with a predetermined gap therebetween, and a liquid crystal 105 is held in the gap. Therefore, the liquid crystal element 120 is a kind of capacity in which the liquid crystal 105 is held as a dielectric material between the pixel electrode 118 and the common electrode 108.

In the embodiment, a transparent substrate such as glass is used in the element substrate and the opposite substrate, and on the opposing surface of the element substrate, a scanning line driving circuit 130 and a data line driving circuit 140 are formed together with the TFT 116 and the like by, for example, a high-temperature polysilicon process. A configuration may also be employed in which a silicon substrate is used in the element substrate, and the control circuit 20, the memory 30 and the converter 40 are formed as a so-called liquid crystal on silicon (LCOS)-type. In the case of the LCOS-type, the liquid crystal element 120 is a reflection-type.

Returning the description to FIG. 1, the scanning line driving circuit 130 sequentially shifts start pulses Dy which are supplied from the control circuit 20 in accordance with a clock signal Cly, and supplies them as scanning signals G1, G2, G3, . . . , G(m−1), and G(m) to the scanning lines 112 of the first, second, third, . . . , (m−1)-th, and m-th rows.

The data line driving circuit 140 sequentially samples the display bits Db converted by the converter 40 by a clock signal Clx, and converts them into voltages having a polarity designated by a signal Pol to supply the voltages as data signals d1, d2, d3, . . . , d(n−1), and d(n) to the data lines 114 of the first, second, third, . . . , (n−1)-th, and n-th columns.

The signal Pol which is supplied by the control circuit 20 is a signal to designate the writing polarity to a pixel (liquid crystal element 120). For example, when the signal Pol is of a H level, positive-polarity writing is designated, when the signal Pol is of an L level, negative-polarity writing is designated. Here, regarding the writing polarity, a case in which the pixel electrode 118 is at a higher side than the common electrode 108 is regarded as a positive polarity, and a case in which the pixel electrode 118 is at a lower side than the common electrode 108 is regarded as a negative polarity. In addition, for example, when the first polarity is a positive polarity, the second polarity is a negative polarity.

Meanwhile, the transmitter 50 transmits a control signal R(/L), which is supplied from the control circuit 20 and shows whether a right eye image or a left eye image has been formed in the display of a 3D video, to the 3D glasses 60 by, for example, infrared light. In the 3D glasses 60, a right eye lens portion is a liquid crystal shutter 62R, and a left eye lens portion is a liquid crystal shutter 62L. The liquid crystal shutters 62R and 62L are controlled to be transparent or opaque in accordance with the control signal R(/L) or the like which is received by a receiver 61. Specifically, in the display of a 3D video, when a control signal R(/L) is of a H level in a field to be described later, the liquid crystal shutter 62R becomes transparent over a partial period of time of the field (for example, later 50%-period of time of the field), and the liquid crystal shutter 62L becomes opaque over the field. On the other hand, when a control signal R(/L) is of a L level in a certain field, the liquid crystal shutter 62R becomes opaque over the field, and the liquid crystal shutter 62L becomes transparent over a partial period of time of the field (for example, later 50%-period of time of the field).

In the display of a 2D video, both of the liquid crystal shutters 62R and 62L become transparent regardless of the control signal R(/L).

In general, when a gradation is expressed by the liquid crystal element 120, a voltage modulation system (analog driving) is employed in which the scanning line 112 is selected and the TFT 116 is turned on as a H level to apply an analog voltage according to a target gradation to the liquid crystal element 120 via the data line 114. However, in this embodiment, either one of an ON-voltage or an OFF-voltage is applied to the pixel electrode 118 to display a gradation as follows. Specifically, in the embodiment, a digital driving system is employed in which either one of an ON-voltage or an OFF-voltage is applied to the pixel electrode 118 in a plurality of subfields and a ratio of the period of time during which the liquid crystal element 120 is turned on or off is changed to express an intermediate gradation.

In the embodiment, a 3D video can also be displayed. Next, a subfield configuration when a 3D video will be described.

Figure 3:
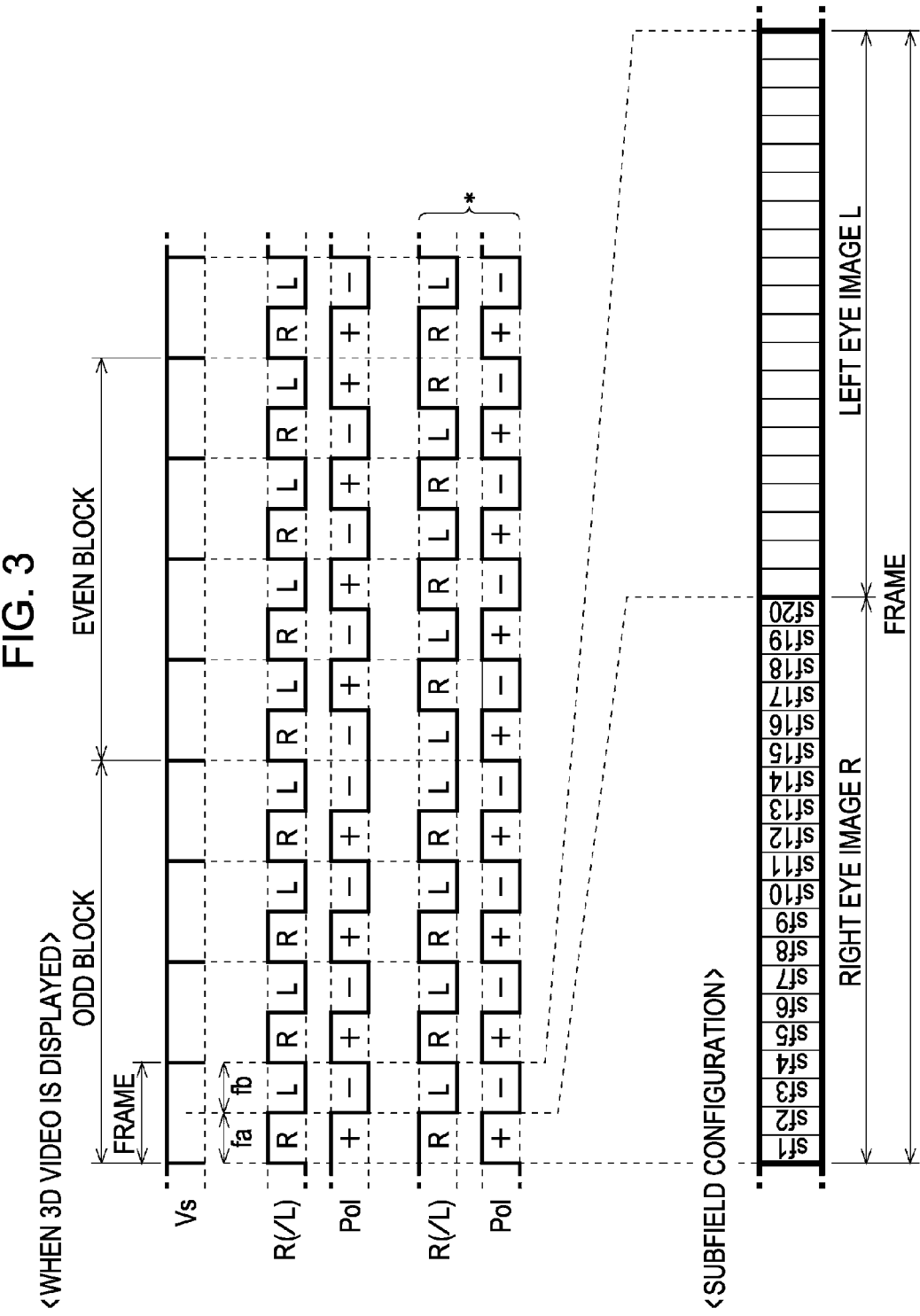
FIG. 3 shows the operation when a 3D video is displayed in the electro-optical device.

FIG. 3 shows a subfield configuration for the case in which a 3D video is displayed in the embodiment.

In the drawing, one frame is a period of time during which a video signal Vid corresponding to one cut (frame) is supplied from a host device, or a period of time necessary for forming an image corresponding to one cut by the liquid crystal panel 100. One frame represents 16.67 milliseconds corresponding to one cycle thereof when a frequency of a vertical scanning signal Vs is 60 Hz.

As shown in the drawing, in the embodiment, the unit which is referred to as a block is configured every four frames. For the sake of convenience, in order to discriminate between two continuous blocks, the temporarily earlier one is referred to as an odd block, and the temporarily later one is referred to as an even block.

In the embodiment, the period of time of one frame is divided into two fields, and when a 3D video is displayed, a temporarily earlier field fa is assigned for a right eye image, and a temporarily later field fb is assigned for a left eye image. Therefore, the control signal R(/L) is a H level in the first-half field fa and is a L level in the second-half field fb in one frame. For example, when a first field is the field fa, a second field is the field fb.

In addition, each of the fields fa and fb is further divided into 20 subfields having the same period length. For the sake of convenience, the respective subfields are referred to as sf1, sf2, sf3, ..., sf20 in temporal order.

In the embodiment, turning-on/off of the subfields sf1 to sf20 is assigned as follows for a gradation level which is designated by the display data Da.

That is, as a general rule, turning-on/off of the subfields sf1 to sf20 is assigned so that with an increase in the gradation level which is designated, the subfields are sequentially turned on in order from, for example, sf1, sf2, sf3 toward the temporarily rear side.

However, only by specifying turning on/off, the number of expressible gradations is limited to "21" from a state in which all of the subfields sf1 to sf20 are turned off to a state in which all of the subfields sf1 to sf20 are turned on through the states in which the subfields are turned on in stages. Therefore, in the embodiment, the following characteristics are also used to increase the number of expressible gradations.

Since the optical response speed of the liquid crystal element 120 with respect to a voltage is relatively low, the transmittance (or reflectance) slowly changes with respect to the application of the ON-level (OFF-level) to the pixel electrode. Therefore, in the normally black mode, for example, even when a case in which ON-driving is performed in the subfields sf1 and sf11 in a discrete manner is the same as a case in which ON-driving is performed over the subfields sf1 and sf2 in a continuous manner in terms of ON-driving period (the number of subfields) in the field, the actual transmittance in the case in which ON-driving is performed in a continuous manner is higher than that in the case in which ON-driving is performed in a discrete manner (brightness increases).

In addition, even when ON-driving is performed in a discrete manner, the actual transmittance in a case in which ON-driving is performed with the subfields adjacent to each other is higher than that in a case in which ON-driving is performed with the separate subfields (brightness increases).

In this manner, the actual transmittance can be changed by turning on/off the subfields in a discrete manner even with the same ON-driving period (the number of subfields) in the field. Accordingly, in the embodiment, 256 gradations, greater than the number of the subfields, can be expressed.

The above-described JP-A-2003-114661 discloses the technique of expressing an intermediate gradation by using the subfields.

Although the specific conversion content is not particularly shown, a table which specifies turning on/off of the subfields sf1 to sf20 for each gradation level which is designated by the display data Da is stored in advance in the converter 40. The converter 40 converts the display data Da read from the memory 30 into the display bits Db for each pixel in accordance with the gradation level and the subfield which is shown by data sfn.

The signal Pol which designates the writing polarity to a pixel is a H level in the field (fa) in the odd block and designates a positive polarity. In the field (fb), the signal Pol is an L level and designates a negative polarity. The signal Pol is an L level in the field (fa) in the even block and designates a negative polarity. In the field (fb), the signal Pol is an H level and designates a positive polarity.

Next, the operation of the electro-optical device 1 according to the embodiment will be described.

First, a 3D video display operation will be described. When a vertical scanning signal Vs is supplied as shown in FIG. 3, the control circuit 20 outputs a start pulse Dy for each start time of the above-described subfields sf1 to sf20 in one frame which is specified by the vertical scanning signal Vs. In addition, the control circuit 20 turns the signal Pol into an H level in a field fa for right eye image in one frame to designate a positive polarity, and holds the signal Pol at an L level in a field for left eye image to designate a negative polarity. In addition, the control circuit 20 counts the number of operations of outputting the start pulse Dy from when one frame is started, and supplies the counted number to the converter 40 as data sfn showing a subfield of the liquid crystal panel 100 at this time.

The control circuit 20 stores a video signal Vid of the right eye image, which is supplied in synchronization with the vertical scanning signal Vs, a horizontal scanning signal Hs, and a dot clock signal Clk, in the memory 30. Then, before selecting a scanning line of a certain row, the control circuit 20 reads out display data Da corresponding to the first to 1920-th columns of pixels in the row from the memory 30. The converter 40 converts the read out display data Da into display bits Db for each pixel in accordance with the gradation level and the subfield which is shown by data sfn.

Strictly speaking, the frame (supply system) which is specified by the supply of the video signal Vid is not the same as the frame (panel system) which is specified by writing scanning of the liquid crystal panel 100. The frame which is specified by writing scanning of the liquid crystal panel 100 is delayed relative to the frame which is specified by the supply of the video signal Vid. However, the period lengths in both of the cases are 16.67 milliseconds, that is, the same as each other (when the vertical scanning frequency is 60 Hz). Accordingly, here, the frames are not strictly discriminated.

By transmitting the start pulse Dy in accordance with a clock signal Cly, the scanning line driving circuit 130 sequentially turns scanning signals G(1) to G(m) into a H level in each subfield. Here, before a scanning line of a certain row is selected by the scanning line driving circuit 130, display data Da of the row is read out from the memory 30 and is converted into display bits Db by the converter 40. Therefore, before the selection of the scanning line, the data line driving circuit 140 is supplied with the display bits Db which correspond to the first to the n-th columns of the pixels corresponding to the scanning line and correspond to the subfield in which the writing is to be performed in the selection.

The data line driving circuit 140 converts, at the ON-voltage or the OFF-voltage, the display bits Db corresponding to one row into a data signal having a polarity which is designated by the signal Pol, and supplies the data signal to the data lines 114 of the first to the n-th columns when the scanning line of the row is selected.

When the scanning line of the row is selected, the data signal supplied to the data line 114 is applied to the pixel electrode 118 of the liquid crystal element 120 when the TFT 116 corresponding to the row is brought into a conduction state. Accordingly, the liquid crystal element 120 is turned on or off with the designated polarity.

When the selection of the scanning line ends, the TFT 116 is brought into a non-conduction state. However, due to the capacity property, the liquid crystal element 120 holds the voltage which is applied to the pixel electrode 118 when the TFT 116 is in a conduction state, and thus ON- or OFF-driving is maintained until the next scanning line is selected again.

Such an operation is sequentially performed in one subfield in order from the first to the m-th rows. Furthermore, this operation is performed in order from the subfields sf1 to sf20 in the first-half field fa.

Accordingly, in each of the subfields sf1 to sf20, each pixel is turned on or off in accordance with the display bits Db, and thus the average transmittance when the field fa is set as a unit period is a value according to the gradation level.

In the display of a 3D video, since the control signal R(/L) is of a H level in the first-half field fa, the liquid crystal shutter 62R of the 3D glasses 60 becomes transparent and the liquid crystal shutter 62L becomes opaque in a partial period of time of the field fa. Therefore, the image which is displayed on the liquid crystal panel 100 is visually confirmed only with the right eye of a viewer.

In the next second-half field fb, a lefty eye image is similarly displayed also on the liquid crystal panel 100. However, in the second-half field fb of the odd block, the signal Pol is of a L level, and thus the left eye image is formed with a negative polarity.

In addition, since the control signal R(/L) is of a L level in the field fb, the liquid crystal shutter 62R becomes opaque, and the liquid crystal shutter 62L becomes transparent in a partial period of time of the field fb. Therefore, the image which is displayed on the liquid crystal panel 100 is visually confirmed only with the left eye of a viewer.

Such an operation is executed in each of the frames of the odd block.

In the even block, the writing polarity is reversed in the first-half field fa and the second-half field fb. Therefore, in the even block, a left eye image which is displayed in the field fa is formed with a negative polarity, and a right eye image which is displayed in the field fb is formed with a positive polarity.

As shown by the symbol * in FIG. 3, when a temporarily earlier field fa is used for a right eye image and a temporarily later field fb is used for a left eye image in the odd block, and a temporarily earlier field fa is used for a left eye image and a temporarily later field fb is used for a right eye image in the even block, the fields fa are formed with a positive polarity and the fields fb are formed with a negative polarity in both of the odd block and the even block, such that the writing polarities of the right eye image and the left eye image are reversed in the odd block and the even block.

In the embodiment, since both the right eye image and the left eye image are formed in half the time period of one frame, and the number of sub-fields thereof is "20", 7 to 8 bits of gradations (128 to 256 gradations) can be expressed.

Furthermore, since the polarity is inverted for each field, it is difficult to visually confirm flickers. That is, in the embodiment, when the frequency of the vertical scanning signal Vs is 60 Hz, the frequency of flicker components is also 60 Hz, whereby it is difficult to visually confirm the flicker components. In the embodiment, the writing polarity in a field is reversed in the odd block and the even block. However, the reversion cycle starts every four frames in the embodiment and the frequency component is low, whereby it is difficult to visually confirm flickers.

According to the embodiment, in one frame of either one of the odd block or the even block, a right eye image is formed with one polarity and a left eye image is formed with the other polarity. However, the right eye image and the left eye image have a time difference therebetween, and are thus not the same as each other. Therefore, even when the right eye image is formed with one polarity and the left eye image is formed with the other polarity, the DC component which is applied to the liquid crystal element 120 in the frame does not become zero. However, when eight frames of the odd block and the even block are set as a unit period, the right eye image and the left eye image are formed with a positive polarity in four fields and formed with a negative polarity in four fields, respectively. Therefore, in the eight frames, the AC driving of the liquid crystal element 120 is completed, whereby a so-called burn-in phenomenon is suppressed.

Here, in order to describe advantages of the embodiment, various comparative examples will be described. FIG. 4 simply shows that for the right eye image and the left eye image in the display of a 3D video, which field and with which cycle the polarity is inverted in comparative examples (a), (b), (c), (d), and (e) with respect to the embodiment (f). FIG. 5 is a table showing the evaluations of the embodiment and the comparative examples.

In FIG. 4, in (f) showing the embodiment, the number of frames constituting a block is "2" for simple expression. In addition, although the number of subfields constituting a field is reduced and is thus "8", the actually appropriate number of subfields is about "20" as described above.

In (f) showing the embodiment, since the polarity is inverted for each field and reversed for each block of the plurality of frames, (f) shows double-speed polarity inversion and polarity inversion every plurality of frames in FIG. 5.

In FIG. 4, the comparative example (a) and the embodiment have in common the fact that a right eye image is displayed in the field fa of one frame and a left eye image is displayed in the field fb and the number of subfields constituting each of the fields. However, the comparative example (a) is different from the embodiment in that the polarity is inverted for each subfield, not for each field.

In that sense, the comparative example (a) shows polarity inversion for each subfield in FIG. 5.

As shown in FIG. 5, in the polarity inversion for each subfield of the comparative example (a), the number of expressible gradations (gradation property), difficulty in visual confirmation of flickers, and burn-in are almost the same as in the embodiment. However, since the polarity is inverted for each subfield, high driving capability is required. For example, when all of the sub-fields are turned on, it is necessary to alternately supply a positive ON-voltage and a negative ON-voltage for each subfield, and it is necessary to drive the liquid crystal element 120 which is a capacity at an extremely high frequency.

On the other hand, in the embodiment, the polarity is inverted for each field and is thus uniform in the field. Therefore, for example, even when all of the sub-fields constituting a field are turned on, the polarity is the same over the field, and thus high driving capability is not required as compared with the comparative example (a).

In FIG. 4, the comparative example (b) relates to a system in which with the division of one frame into four fields, for example, a right eye image is formed with a positive polarity in a first field, a right eye image is formed with a negative polarity in a second field, a left eye image is formed with a positive polarity in a third field, and a left eye image is formed with a negative polarity in a fourth field.

That is, in the comparative example (b), the polarity is inverted for each of the four fields into which one frame is divided. In that sense, in FIG. 5, the comparative example (b) shows quadruple-speed polarity inversion.

As shown in FIG. 5, in the quadruple-speed polarity inversion of the comparative example (b), the Ac driving of the right eye image and the left eye image is completed in one frame, and thus the burn-in phenomenon is suppressed. In addition, the polarity is inverted for each of the four fields into which one frame is divided, that is a short period of time, it is hard to visually confirm flickers.

However, in the comparative example (b), in each of the four fields into which one frame is divided, it is necessary to further divide the field into subfields. Therefore, in the comparative example (b), the number of securable subfields constituting a field is only about "10". Therefore, in the comparative example (b), only 4 to 5 bits of gradations (16 to 32 gradations) are expressed. Accordingly, the comparative example (b) is said to be inferior to the embodiment.

In FIG. 4, the comparative example (c) and the embodiment have in common the fact that a right eye image and a left eye image are formed in the first-half field and the second-half field of one frame, respectively, and the number of subfields constituting each of the fields. However, in the comparative example (c), the polarity is fixed in the first-half field and the second-half field.

In that sense, the comparative example (c) shows double-speed polarity inversion in FIG. 5.

As shown in FIG. 5, in the double-speed polarity inversion of the comparative example (c), the number of expressible gradations (gradation property) and difficulty in visual confirmation of flickers are almost the same as in the embodiment.

Here, in the comparative example (c), since a right eye image is formed with one polarity and a left eye image is formed with the other polarity in a certain frame, the DC component which is applied to the liquid crystal element 120 does not become zero. Furthermore, in the comparative example (c), since the polarity is not reversed in the odd block and the even block as in the embodiment, the AC driving is not completed over a plurality of frames. Therefore, the comparative example (c) is inferior to the embodiment in terms of burn-in.

In FIG. 4, the comparative example (d) and the embodiment have in common the fact that a right eye image and a left eye image are formed in the first-half field and the second-half field of one frame, respectively, and the number of subfields constituting each of the fields. However, in this comparative example (d), the polarity is inversed for each frame.

In that sense, the comparative example (d) shows single-speed polarity inversion in FIG. 5.

As shown in FIG. 5, in the single-speed polarity inversion of the comparative example (d), the number of expressible gradations (gradation property) and burn-in are almost the same as in the embodiment. However, in the comparative example (d), the polarity is inversed for each frame, and thus when the frequency of the vertical scanning signal Vs is 60 Hz, the frequency of flicker components is a half of the above frequency, that is, 30 Hz, whereby it is difficult to visually confirm the flicker components.

In FIG. 4, the comparative example (e) and the embodiment have in common the fact that a right eye image and a left eye image are formed in the first-half field and the second-half field of one frame, respectively, and the number of subfields constituting each of the fields. However, in the comparative example (e), the polarity is inversed every two frames. The polarity may be inversed every three or more frames.

In that sense, the comparative example (e) shows polarity inversion every plurality of frames in FIG. 5.

As shown in FIG. 5, in the polarity inversion every plurality of frames of the comparative example (e), the number of expressible gradations (gradation property) is almost the same as in the embodiment. However, in the comparative example (e), the polarity is inverted every two or more frames, and thus flickers are easily confirmed compared with the embodiment although not so easily as in the comparative example (d). In addition, in the comparative example (e), when four frames are set as a unit, the AC driving is completed, but when one frame is set as a unit, the polarity is fixed.

In the embodiment (f), since a right eye image is formed with one polarity and a left eye image is formed with the other polarity in one frame, the DC component does not become zero. However, in terms of the suppression of burn-in, the embodiment (f) is superior to the comparative example (e) in which the polarity is fixed.

In this manner, it is found that when compared with the comparative examples (a) to (e), the embodiment (f) has advantages in terms of the gradation property, flickers, burn-in, and the fact that high driving capability is not required.

In addition, according to the embodiment, smooth switching from a 3D video to a 2D video, or from a 2D video to a 3D video is possible. Hereinafter, the switching will be described.

FIG. 6 shows a subfield configuration when a 2D video is displayed in the embodiment.

As shown in the drawing, when a 2D video is displayed, there is no concept of the right eye image and the left eye image. However, the display of a 2D video and the display of a 3D video have in common the fact that one frame is divided into a first-half field fa and a second-half field fb.

However, in the embodiment, when a 2D video is displayed, an image is formed with one of a positive polarity and a negative polarity in the field fa, and the same image as in the field fa is formed with the other polarity in the second field fb. Regarding this, there are two ways as follows. Specifically, as shown in the drawing, there are two cases of (a) the signal Pol is of a H level in the first-half field fa and thus an image is formed with a positive polarity, and in the second-half field fb, the signal Pol is of a L level and thus an image is formed with a negative polarity, and (b) the signal Pol is of a L level in the first-half field fa and thus an image is formed with a negative polarity, and in the second-half field fb, the signal Pol is of a H level and thus an image is formed with a positive polarity.

The subfield configuration in each field is in common with the configuration for when a 3D video is displayed as shown in FIG. 3.

In addition, when a 2D video is displayed, the liquid crystal shutters 62R and 62L of the 3D glasses 60 become transparent.

As shown in FIG. 7, in the embodiment, switching from a 3D video to a 2D video is performed at the end of the odd block or the even block when the 3D video is displayed.

As described above, when a 3D video is displayed, the signal Pol is of a H level in the first-half field in the odd block, and is of a L level in the second-half field fb. However, in the even block, the signal Pol is of a L level in the first-half field fa, and is of a H level in the second-half field. Regarding the signal Pol, there are two ways of the case (a) and the case (b) in the display of a 2D video.

Therefore, in the embodiment, for switching from a 3D video to a 2D video, four combinations with regard to the signal Pol are considered as shown in FIG. 7. That is, there are total four ways of a first case of the switching to the case (a) at the end of the odd block, a second case of the switching to the case (b) at the end of the odd block, a third case of the switching to the case (b) at the end of the even block, and a fourth case of the switching to the case (a) at the end of the even block.

Among the four ways, in the first and third cases, the polarity of the first-half field fa and the polarity of the second-half field fb do not change in switching from a 3D video to a 2D video, whereby changes occurring with the switching can be reduced.

Figure 8:
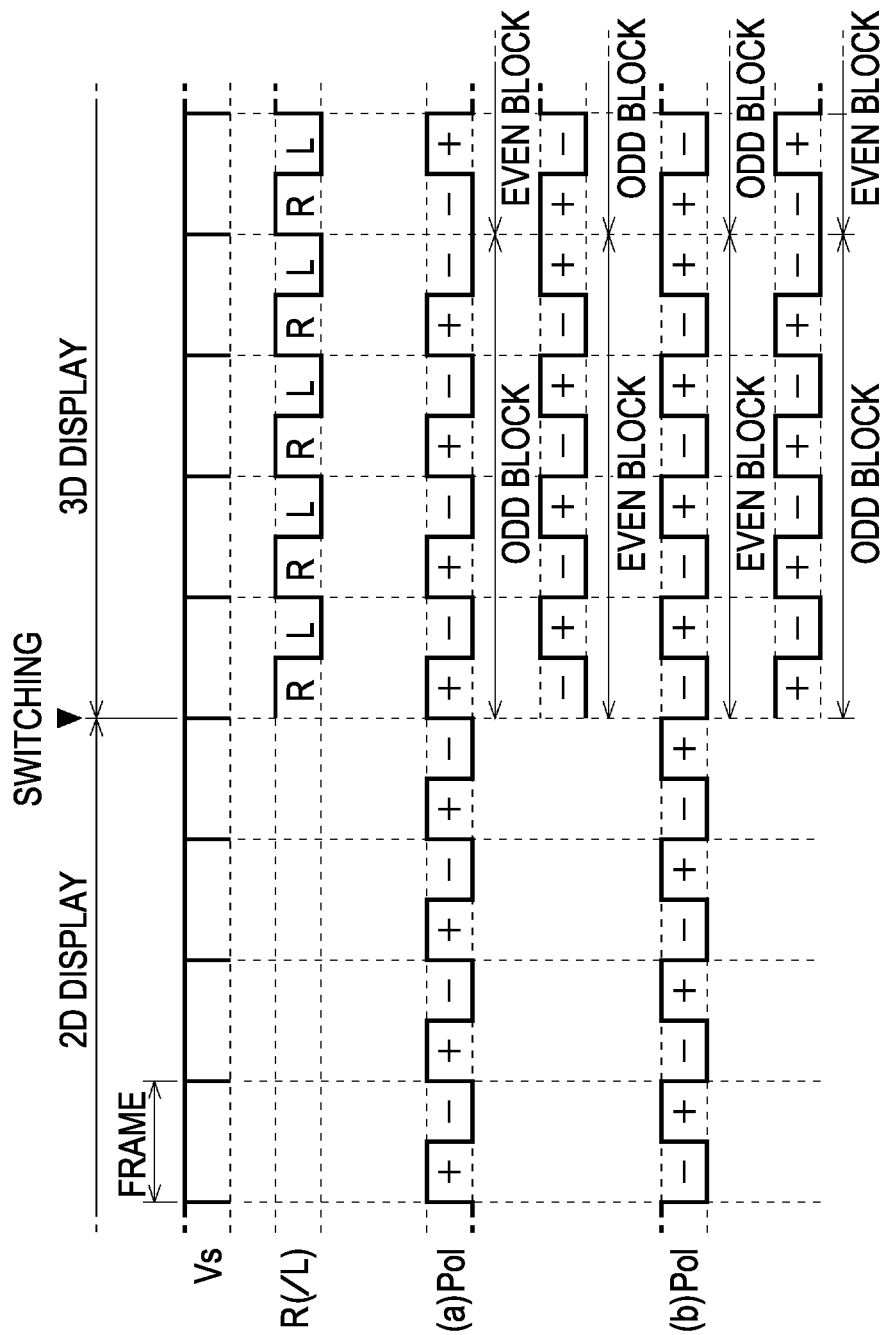
FIG. 8 is a diagram showing an example of switching from a 2D video to a 3D video in the electro-optical device.

As shown in FIG. 8, in the embodiment, switching from a 2D video to a 3D video is performed at the end of the frame (second-half field fb) when the 2D video is displayed.

Regarding the signal Pol, there are two ways of the case (a) and the case (b) in the display of a 2D video, and there are two ways of the odd block and the even block in the display of a 3D video. Accordingly, in switching from a 2D video to a 3D video, four combinations with regard to the signal Pol are considered as shown in FIG. 8. That is, there are four ways of a fifth case of the switching from the case (a) to the odd block, a sixth case of the switching from the case (a) to the even block, a seventh case of the switching from the case (b) to the even block, and an eighth case of the switching from the case (b) to the odd block.

Among the four ways, in the fifth and seventh cases, the polarity of the first-half field fa and the polarity of the second-half field fb do not change in switching from a 2D video to a 3D video, whereby changes occurring with the switching can be reduced.

According to the embodiment, the polarity is inverted for each field in the display of a 3D image, and also in the display of a 2D image. Accordingly, the uncomfortable feeling caused by the switching of display can be reduced.

The invention is not limited to the above-described embodiments, and the following applications and modifications can be made.

In the embodiments, a right eye image is formed in the first-half field fa and a left eye image is formed in the second-half field fb in the display of a 3D image. However, the left eye image may be formed in the first-half field fa and the right eye image may be formed in the second-half field fb.

In addition, the number of frames constituting the odd block and the even block in the display of a 3D image is not limited to "4", and may be "2" or greater.

Electronic Apparatus

Next, a projector will be described as an example of an electronic apparatus to which the above-described electro-optical device 1 according to the embodiment is applied.

Figure 9:
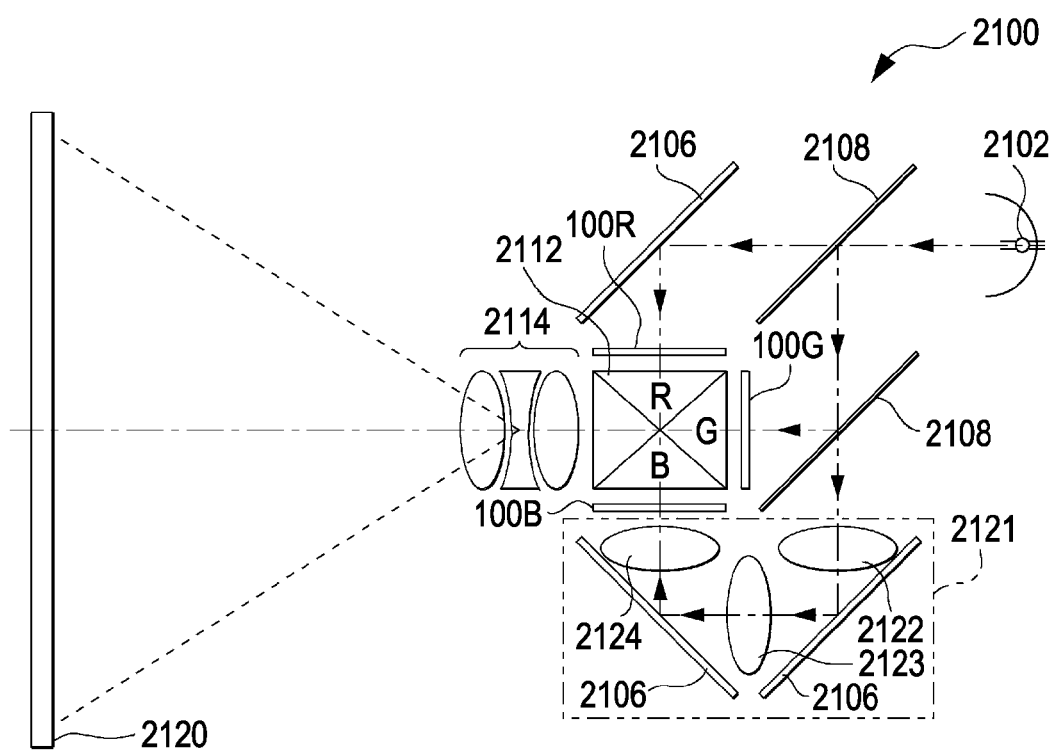
FIG. 9 is a diagram showing the configuration of a projector to which the electro-optical device is applied.

FIG. 9 is a plan view showing the configuration of a projector.

As shown in the drawing, in a projector 2100, a lamp unit 2102 formed of a white light source such as a halogen lamp is provided. The projection light which is emitted from the lamp unit 2102 is separated into light beams of the three primary colors of R, G and B by three mirrors 2106 and two dichroic mirrors 2108 which are disposed in the projector 2100. The separated light beams are guided to light valves 100R, 100G, and 100B corresponding to the respective primary colors. The light beams of B have a longer optical path than the light beams of R and G. Accordingly, the light beams of B are guided via a relay lens system 2121 formed of an incident lens 2122, a relay lens 2123, and an outgoing lens 2124 in order to prevent the loss of the light beams of B.

In the projector 2100, three display devices according to the embodiment are provided corresponding to the respective colors of R, G and B. Video signals corresponding to the respective colors of R, G, and B are supplied from host devices, respectively. The light valves 100R, 100G, and 100B are the same as in the above-described liquid crystal panel 100, and are driven in accordance with the video signals corresponding to the respective colors of R, G and B, respectively.

The light beams modulated by the light valves 100R, 100G, and 100B are incident on a dichroic prism 2112 from three directions. In the dichroic prism 2112, the light beams of R and B are refracted at 90 degrees and the light beams of G go straight ahead. Accordingly, the images of the respective colors are synthesized, and then projected as a color image on a screen 2120 by a projection lens 2114.

Since the light beams corresponding to R, G and B are incident on the light valves 100R, 100G and 100B by the dichroic mirrors 2108, there is no need to provide color filters. In addition, the transmitted images of the light valves 100R and 100B are reflected by the dichroic prism 2112 and then projected, while the transmitted image of the light value 100G is projected as it is. Therefore, the horizontal scan direction by the light valves 100R and 100B is opposite to the horizontal scan direction by the light valve 100G, such that the images of which the right and left sides are reversed are displayed.

When wearing the above-described 3D glasses 60 and viewing the image projected on the screen 2120, it is possible to perceive the 3D video.

In the light valves 100R, 100G, and 100B, switching of the odd block and the even block is performed at the same time. That is, in the light valve 100R, when a left eye image is formed with a positive polarity and a right eye image is formed with a negative polarity, a left eye image is formed with a positive polarity and a right eye image is formed with a negative polarity also in the light valves 100G and 100B. In the light valve 100R, when a left eye image is formed with a negative polarity and a right eye image is formed with a positive polarity, a left eye image is formed with a negative polarity and a right eye image is formed with a positive polarity also in the light valves 100G and 100B.

Examples of the electronic apparatus include an electronic viewfinder, a rear projection-type TV, a head mounted display, and the like other than the projector described with reference to FIG. 9.

This application claims priority from Japanese Patent Application No. 2011-055741 filed in the Japanese Patent Office on Mar. 14, 2011, the entire disclosure of which is hereby incorporated by reference in its entirely.

What is claimed is:

1. A method of driving an electro-optical device which divides one frame into at least a first field and a second field, divides each of the first field and the second field into a plurality of subfields, and controls a pixel to be turned on or off for each of the plurality of subfields, thereby displaying a grayscale level,
    wherein when a 3D video is displayed, either image one of a right eye image or a left eye image is formed with a first polarity in the first field, and the other image of the right eye image or the left eye image is formed with a second polarity in the second field, and
    wherein when a plurality of frames elapse, either image is formed with the second polarity in the first field, and the other image is formed with the first polarity in the second field,
    wherein the grayscale level for each field of either the image of the right eye image or the left eye image in each frame has the same polarity.

2. The method of driving an electro-optical device according to claim 1,
    wherein when a 2D video is displayed, an image of one frame is formed with either one of the first polarity or the second polarity in the first field, and
    the image of the frame is formed with the other in the second field.

3. The method of driving an electro-optical device according to claim 2,
    wherein in the switching from the display of the 3D video to the display of the 2D video, the other image is formed with the second polarity in the second field in the display of the 3D video, and then the image of one frame is formed with the first polarity in the first field in the display of the 2D video.

4. The method of driving an electro-optical device according to claim 2,
    wherein in the switching from the display of the 2D video to the display of the 3D video, the image of the frame is formed with the second polarity in the second field in the display of the 2D video, and then either image is formed with the first polarity in the first field in the display of the 3D video.

5. An electro-optical device which divides one frame into at least a first field and a second field, divides each of the first field and the second field into a plurality of subfields, and controls a pixel to be turned on or off for each of the plurality of subfields, thereby displaying a grayscale level, the device comprising:
    a driving circuit which forms, when a 3D video is displayed, either image one of a right eye image or a left eye image with a first polarity in the first field, and forms the other image with a second polarity in the second field, and which forms, when a plurality of frames elapse, either image with the second polarity in the first field, and forms the other image with the first polarity in the second field,
    wherein the grayscale level for each field of either the image of the right eye image or the left eye image in each frame has the same polarity.

6. An electronic apparatus incorporating the electro-optical device according to claim 5.

7. A method of driving an electro-optical device which divides a frame into at least a first field and a second field, divides each of the first field and the second field into a plurality of subfields, and controls display of a pixel in each of the plurality of subfields,
    a first image corresponding to one of an image for a right eye or an image for a light eye is displayed in the first field of a first frame,
    a second image corresponding to another of the image for the right eye and the image for the left eye is displayed in the second field of the first frame,
    the first image is formed with data signals of a first polarity,
    the second image is formed with data signals of a second polarity, the second polarity is different polarity from the first polarity,
    a third image corresponding to one of an image for the right eye or an image for the light eye is displayed in the third field of a second frame, the second frame passed a plurality of frame after the first frame,
    a forth image corresponding to another of the image for the right eye and the image for the left eye is displayed in the fourth field of the second frame,
    the third image is formed with data signals of the second polarity,
    the forth image is formed with data signals of the first polarity,
    wherein the grayscale level for each field of either the image of the right eye image or the left eye image in each frame has the same polarity.

\* \* \* \* \*